United States Patent [19]
Chandran et al.

[11] Patent Number: 6,165,563
[45] Date of Patent: Dec. 26, 2000

[54] RADIATION CURABLE FREE RADICALLY POLYMERIZED STAR-BRANCHED POLYMERS

[75] Inventors: Rama S. Chandran, Bridgewater; Smita M. Shah, Edison; Paul B. Foreman, Somerville, all of N.J.

[73] Assignee: National Starch and Chemical Investment Holding Corporation, Wilmington, Del.

[21] Appl. No.: 09/190,158

[22] Filed: Nov. 12, 1998

[51] Int. Cl.$^7$ .................. C08J 3/28; C08J 7/04; C08F 2/50

[52] U.S. Cl. ............... 427/516; 427/515; 427/517; 427/508; 522/134; 522/135; 522/136; 522/137; 522/138; 522/139; 522/140; 522/142; 522/143; 522/144; 522/149; 528/376; 528/374; 528/364

[58] Field of Search ................... 528/376, 374, 528/364; 522/134, 135, 137, 138, 139, 140, 142, 143, 144, 149; 427/508, 515, 516, 517

[56] References Cited

U.S. PATENT DOCUMENTS

| | | | |
|---|---|---|---|
| 3,364,182 | 1/1968 | Griffith | 260/79 |
| 3,769,254 | 10/1973 | Anderson et al. | 260/33.4 PQ |
| 5,391,406 | 2/1995 | Ramharack et al. | 427/516 |
| 5,399,642 | 3/1995 | Emmons et al. | 526/224 |
| 5,416,127 | 5/1995 | Chandran et al. | 522/149 |
| 5,473,048 | 12/1995 | Sarkar | 528/376 |
| 5,489,397 | 2/1996 | Bainbridge | 252/174.24 |
| 5,492,965 | 2/1996 | Emmons et al. | 524/833 |
| 5,495,965 | 3/1996 | Emmons et al. | 524/833 |
| 5,498,675 | 3/1996 | Emmons et al. | 525/537 |
| 5,536,759 | 7/1996 | Ramharack et al. | 522/35 |
| 5,574,117 | 11/1996 | Yoshida et al. | 526/224 |
| 5,679,762 | 10/1997 | Yoshida et al. | 528/364 |
| B1 3,769,254 | 2/1985 | Anderson et al. | 524/398 |

FOREIGN PATENT DOCUMENTS

| | | | |
|---|---|---|---|
| 0 448 224 A1 | 9/1991 | European Pat. Off. | C08F 2/38 |
| 0 449 413 A1 | 10/1991 | European Pat. Off. | C08F 2/38 |
| 0 541 272 A1 | 5/1993 | European Pat. Off. | C08F 2/38 |
| 1645232 | 11/1966 | Germany | C08F 20/18 |
| 9-53059 | 2/1997 | Japan | C09J 201/00 |
| 2 294 467 | 5/1996 | United Kingdom | C08F 20/14 |
| WO 96/37520 | 11/1996 | WIPO | C08F 2/38 |

OTHER PUBLICATIONS

Schaefgen and Flory, "Synthesis of Multichain Polymers and Investigation of their Viscosities", JACS, Aug. 1948, vol. 709, pp. 2709–2718.

Morton, Helminiak, Gadkary and Bueche, "Preparation and Properties for Monodisperse Branched Polystyrene", *Journal of Polymer Science*, vol. 57, pp. 471–482 (1962).

Kauder, "Thiols", *Encyclopedia of Chemical Technology*, Third Edition, vol. 22, pp. 946–964.

Jérome and Teyssié, Star–Shaped Block Copolymers. IV. Emulsifying Activity in the Water–Oil Emulsions, *Journal of Applied Polymer Science*, vol. 26, 343–351 (1981).

"Branched Polymers", *Encyclopedia of Polymer Science and Engineering*, vol. 2, pp. 478–499.

Simms and Spinelli, "Recent Advances in Group Transfer Polymerization and Their Applications In Coatings", *Journal of Coatings Technology*, vol. 59, No. 752, Sep. 1987, pp. 125–131.

Yuan and Di Silvestro, "Polymerization of methyl methacrylate in the presence of polyfunctional chain transfer agents", Macromol. Chem. Phys. 196, 2905–2913 (1995).

Erickson, Zimmermann, Southwick and Kiibler, "Liquid Reactive Polymers for Radiation Curable High Performance PSAs", *Adhesives Age*, Nov. 1995.

Puts and Sogah, "Universal Multifunctional Initiator Containing Orthogonal Reactive Sites . . . ." *Macromolecules* 1997, 30, 7501–7055.

Ullisch and Burchard, "Branching in Free Radical Polymerization Due to Chain Transfer . . .", *Makromol. Chem.*, 178, 1427–1437 (1977).

European Coatings Journal, vol. 1–Feb. 1998, p.87.

Gia et al., "Star–shaped block copolymers. II. Microemulsions stabilizers", Colloid & Polymer Science 257, 1294–1296 (1979).

*Primary Examiner*—James J. Seidleck
*Assistant Examiner*—Sanza L. McClendon
*Attorney, Agent, or Firm*—Thomas F. Roland

[57] ABSTRACT

This invention relates to star-branched polymers containing pendent olefinic groups which have been crosslinked using actinic radiation and the use of these polymers in adhesives and coating applications.

18 Claims, No Drawings

RADIATION CURABLE FREE RADICALLY POLYMERIZED STAR-BRANCHED POLYMERS

FIELD OF THE INVENTION

This invention relates to star-branched polymers containing pendent olefinic groups which have been radiation cured by UV or EB radiation, and to the use of these polymers in adhesives and coating applications.

BACKGROUND OF THE INVENTION

Solution linear polymers made by free radical polymerization need to be crosslinked during or after application to improve their mechanical strength, heat resistance and chemical resistance for various high performance applications. The crosslinking reaction can be induced by chemical, thermal or actinic radiation processes. U.S. Pat. No. 5,536,759 discloses a hot melt pressure sensitive adhesive prepared from a linear, saturated polymer with pendant vinyl groups which are crosslinked by UV radiation.

High molecular weight linear polymers, which result in solution viscosities proportional to their molecular weights, are usually used in high performance applications. Attempts to lower the solution viscosities of these polymers by reducing the polymer's molecular weight leads to poor performance attributes which make them difficult to use as hot melts for high performance adhesives and coating applications. Therefore linear polymers are usually limited by their molecular weigh, and therefore also have limited uses.

To circumvent these problems, low molecular weight polymers have been made with olefinic unsaturation on side chains. The olefinic unsaturation is then crosslinked by electron beam or ultra-violet irradiation to provide sufficient cohesion and tack. Ordinarily, most of the olefinic double bonds that polymerize by free radical reactions are also thermally polymerizable. In this regard, it is known that acrylates, methacrylates, styrenes, vinyl ester, and allyl compounds, for example, are quite susceptible to thermally induced polymerization (see, Principles of Polymerization, Second Edition, George Odian, John Wiley & Sons (1981), page 214).

Star polymers having three or more polymeric arms have lower solution and melt viscosities than conventional linear polymers with the same molecular weights due to both lower radii of gyration and lower polydispersity (lower amount of high molecular weight fraction) J. Roovers in Encyclopedia of Polymer Science and Engineering, Vol. 2, Ed. 2, 1985, pp. 478–495.

Star-branched polymers, also known as radial polymers, are characterized by having three or more polymeric arms emanating from a central core. These polymers can be prepared by various polymerization procedures such as anionic, cationic, and free radical mechanisms. The star polymers are usually formed by using either multifunctional initiators, multifunctional chain transfer agents, or multifunctional coupling agents. The star polymers have unique properties including: narrow molecular weight distributions; low viscosities at low molecular weights or in solution due to their compact structures; and high viscosities at high molecular weights due to extensive entanglements.

The functionalized star polymers of the present invention, when crosslinked, can be used as a high solids solution or as hot melts for high performance adhesives and coating applications.

Radiation crosslinking (curing) of star polymers containing pendant unsaturation offers several advantages over conventional methods. The chemical reactions involved in radiation crosslinking are specific to the type of source of radiation which allows precise control of the crosslinking to achieve desired properties. Compositions designed for radiation curing polymers are not affected by the chemical or the thermal environment of the sample until they are subjected to the radiation source. The presence of the double bonds allows crosslinking at lower radiation doses compared with polymers without the double bond, for the same molecular weight. This allows long shelf life and consistent performance characteristics independent of the storage history of the product. In many cases no additional chemical agents are needed to affect the radiation crosslinking, thus leading to cleaner and simpler polymer systems. The use of star polymers that can be radiation cured offers other environmental and economic benefits due to lower emission of volatile organic compounds (VOC's) and lower energy cost due to the lower viscosities at high solids.

Although star polymer are well known, there has not been a disclosure of star polymers containing olefinic functionality for radiation curable crosslinking.

EP 0 449 413 A1 (1992) describes the use of star polymers derived from polythiols and other functional monomers which are capable of crosslinking via condensation reactions with epoxys, siloxanes or isocyanates. There is no disclosure of star branched polymers with olefinic functionality or of radiation curable compositions.

Block copolymers prepared using polythiols with a latent, or masked, thiol as a chain transfer agent have been disclosed U.S. Pat. No. 5,399,642, U.S. Pat. No. 5,492,965 and U.S. Pat. No. 5,498,675. Bulk polymerization of vinyl monomers using polythiols to prepare adhesives, coatings and molding applications have also been disclosed. U.S. Pat. No. 5,574,117 and U.S. Pat. No. 5,679,762. None of these references disclose star polymers containing olefinic functionality for radiation crosslinking.

SUMMARY OF THE INVENTION

This invention relates to star polymers containing pendent olefinic groups which have been crosslinked using actinic radiation and the use of these polymers in adhesives and coating applications.

This invention also relates to a process for the preparation of a radiation cured adhesive that is a viscoelastic solid at room temperature, fluid and thermally stable at commonly employed industrial application temperatures, and will crosslink upon exposure to UV or EB radiation to provide pressure sensitivity. The process comprises preparing a star polymer from acrylic, or a combination of acrylic and vinyl, monomers, introducing pendant unsaturation onto the saturated polymeric chain by the incorporation of a monomer containing a functional group capable of reacting under non-free radical conditions in a separate reaction from the initial polymerization, and crosslinking the pendant vinyl unsaturation by irradiation. For pressure sensitive applications, such crosslinking will provide the required pressure sensitivity. The introduction of the pendant unsaturation in a separate reaction from the initial polymerization avoids any problem of premature gelation of the adhesive, and the use of a monomer containing a functional group capable of reacting under non-free radical conditions, in comparison to other olefinic compounds for crosslinking, eliminates any thermally induced crosslinking during processing or coating operations.

DETAILED DESCRIPTION OF THE INVENTION

This invention relates to star polymers containing pendent olefinic groups which have been crosslinked using actinic radiation and the use of these polymers in adhesives and coating applications. The process of the present invention can be used to prepare hot melt adhesives or high solids adhesives for use in pressure sensitive applications.

The process for the preparation of high solids adhesives comprises the steps of: (a) preparing a star polymer by solution polymerization from a mercaptan core with polymeric arms comprising acrylic, or a combination of acrylic and vinyl, monomers, at least one of which also contains a functional group, such as, a hydroxyl, amine, carboxyl or amide group, to result in a polymer that is a viscoelastic solid at ambient temperature, having at least one glass transition temperature (Tg) in the range of −60° C. to +5° C., preferably −50° C. to −5° C.; (b) reacting the functional group on the star polymer with a monomer containing a functional group capable of reacting under non-free radical conditions in a condensation reaction, thereby providing a polymer that is a solid at ambient temperature, and that has pendant vinyl groups that are stable to thermally induced crosslinking at temperatures up to 180° C.; and (c) exposing the polymer to electron beam or ultraviolet radiation sufficient to crosslink the pendant vinyl groups and provide an adhesive.

The process for preparation of a hot melt adhesive comprises the same steps as discussed above for high solids, however with the additional step of vacuum stripping the solvent prior to exposing the polymer to electron beam or ultraviolet radiation sufficient to crosslink the pendant vinyl groups and provide an adhesive.

In other embodiments, this invention is a) a radiation curable hot melt adhesive that achieves pressure sensitivity on irradiation with UV or EB radiation; b) the radiation cured hot melt pressure sensitive adhesive itself; c) the radiation cured hot melt pressure sensitive adhesive on a substrate.

Other embodiments of this invention include a) a radiation cured high solids adhesive that achieves pressure sensitivity on irradiation with UV or EB radiation; b) the radiation cured high solids pressure sensitive adhesive itself; c) the radiation cured high solids pressure sensitive adhesive on a substrate; and d) and to high solids solutions of the polymer.

The star polymers employed in the present invention comprise a central core and three or more polymeric arms which extend radially from the core. The compositions of the arms themselves may be random, blocks or homopolymers. Specifically, the present invention is directed to star polymers comprising pendent olefinic groups which have been crosslinked using actinic radiation.

The polymer arms of the star polymers are derived from olefinic monomers, wherein at least one of the monomers comprises a functional group which is capable of reacting under non-free radical conditions with a functional olefin.

The polyvalent mercaptan core of the present invention comprises three or more thiol groups. The thiol groups can be either all the same or all different or variations therein. Preferably, at least two of the thiol groups are of different reactivities, such that the core is of differential reactivity. It is at the thiol groups that the monomers will react to create the polymeric arms of the star polymer. Cores comprising thiol groups, all of which are of the same composition and reactivity will be referred to as homocores.

Specifically, the polyvalent mercaptan core comprises a central component, derived from a multifunctional alcohol which has been substituted with thiol derivatives. The multifunctional alcohol can have any number of functional hydroxy units, preferably 3 to 8 functional units. To prepare the core of the present invention, each of the OH functional units will be substituted with thiol units, preferably at least 2 of which are of different compositions. Accordingly, in the preferred embodiment the core compositions range from a tri-functional alcohol substituted with three identical thiol groups, up to an octa-functional alcohol substituted with eight different thiol groups.

In one embodiment of the present invention, the polyvalent mercaptan core is of the general formula:

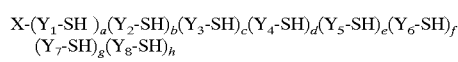

or one of the following specific embodiments:

         (I)

         (II)

         (III)

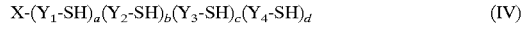         (IV)

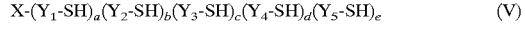         (V)

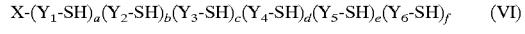         (VI)

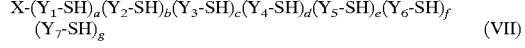         (VII)

or

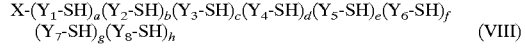         (VIII)

where X is derived from an organic radical having a valence of 3–8. Preferably, X is derived from a tri- to octa- multifunctional alcohol such as glycerol, sorbitol, trimethylolpropane, pentaerythritol, dipentaerythritol, tripentaerythritol, and inositol.

Variables $Y_1$, $Y_2$, $Y_3$, $Y_4$, $Y_5$, $Y_6$, $Y_7$ and $Y_8$ are the same or different and each comprises $C_{2-10}$ alkanoic acids, preferably $C_{2-6}$ alkanoic acids. Variables a, b, c, d, e, f, g and h are integers from 0–8 provided that $a+b+c+d+e+f+g+h \leq 8$. If the core is a core of differential reactivity, or heterocore, a and b are integers from 1–8, and c, d, e, f, g, h are integers from 0–8 provided that $a+b+c+d+e+f+g+h \leq 8$. If the core is a homocore, $b=c=d=e=f=g=h=0$.

Each of the above identified (Y-SH) units are derived from, for example, 2-mercaptoacetic acid, 2-mercaptopropionic acid, 3-mercaptopropionic acid, 4-mercaptobutyric acid, 5-mercaptopentanoic acid, or 6-mercaptohexanoic acid. Preferred are 2-mercaptopropionic acid and 3-mercaptopropionic acid.

Examples of cores of differential reactivity include pentaerythritol bis(3-mercaptopropionate)bis(2-mercaptopropionate); trimethylolpropane bis(3-mercaptopropionate)(2-mercaptopropionate); pentaerythritol tris(3-mercaptopropionate)(2-mercaptopropionate); and trimethylolpropane bis(2-mercaptopropionate)(3-mercaptopropionate).

Cores of non-differential reactivity, or homocores, include pentaerythritol tetrakis(3-mercapto propionate), trimethylolpropane trithiopropionate, pentaerythritol tetrakisthioglycolate and dipentaerythritol hexakis thioglycolate.

In general, polyvalent mercaptan core is prepared by reacting the multi-functional alcohol with the appropriate amount of mercapto acid to prepare the polyvalent mercaptan core. For example, if the multifunctional alcohol is a tri-alcohol, three equivalents of mercapto acid are added to give three (HS-Y) units. The three equivalents of mercapto acid can be made up of any combination of the preferred mercapto acids. For example, one equivalent of 2-mercaptopropionic acid (a secondary thiol containing acid) and two equivalents of 3-mercaptopropionic acid (a primary thiol containing acid) will provide a core of differential reactivity. If the alcohol is a trialcohol and 3 equivalents of 2-mercaptopropionic acid are used, a homocore is obtained.

In a specific example, pentaerythritol can be used as the multifunctional alcohol, X, used to prepare the core. To pentaerythritol is added 2 mole equivalents each of a primary thiol, 3-mercaptopropionic acid, and a secondary thiol, 2-mercaptopropionic acid. The result will be a mixture of five compounds corresponding to molecules containing ratios of primary/secondary SH groups of 0/4, 1/3, 2/2, 3/1, and 4/0. Those cores with ratios of 1/3, 2/2 and 3/1 have differential reactivity and are within the scope of the present invention. The cores with ratios of 0/4 and 4/0 are homocores. The product mixture, though a statistical mixture, has cores with an average of two primary thiol groups and two secondary thiol groups per core as shown by the following reaction:

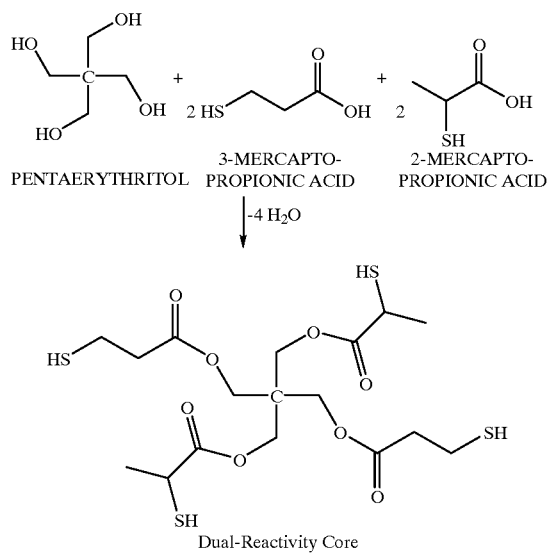

With dipentaerythritol, seven possible compounds can be obtained corresponding to 0,1,2,3,4,5 and 6 primary SH groups per molecule. These differential thiols will be utilized to provide enhanced selectivity to generate heteroarm stars.

In an alternative embodiment, 4 mole equivalents of thiol can be added to pentaerythritol:

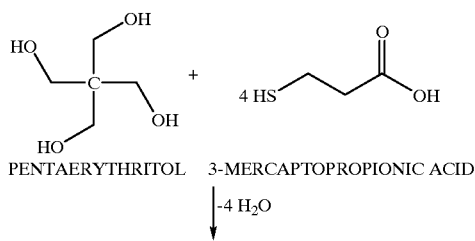

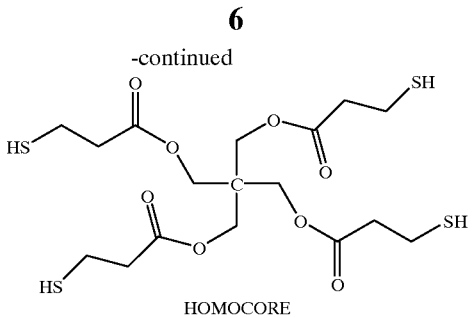

HOMOCORE

The star polymers of the present invention are formed using the mercaptan core as a chain transfer agent in polymerization processes which include bulk, solution, emulsion, and suspension polymerization. Preferably the process is a solution polymerization process employing a free radical initiator. The polymerization reaction is typically conducted at temperatures in the range of 10 to 120° C., preferably 70 to 100° C.

The present invention contemplates that the resulting polymer may comprise arms that are all different, or some different, or some the same, or all the same after the S atom but with different Y connecting groups.

In one embodiment, the preparation of the star polymers of the present invention is by the non-sequential addition of monomers to the mercaptan core. In this embodiment, the core may be a core of differential reactivity, or a homocore. During the process of this embodiment, all of the monomers are added at the same time, i.e., a mixture of two or more monomers are added to the core. If the core is a core of differential reactivity, the monomers with a chain transfer constant closest to one will react with the most reactive thiol groups. If the core is a homocore, the mixture of monomers will react randomly leading to random polymeric arms on the resulting star polymer. With either embodiment, the polymerization is initiated by a mercapto group on the polyvalent mercaptan core.

In another embodiment, the preparation of the star polymers is by sequential addition of the monomer to a homocore or a core of differential reactivity. With the core of differential reactivity, the monomer that is added first will tend to react with the more reactive SH groups. It is preferred that such monomers have a chain transfer constant close to one, i.e., acrylates and methacrylates. The monomers added next will react with the less reactive SH groups. In general, the orders of reactivity of thiol groups are: SH groups attached to aromatic rings (i.e., thiophenols) are more reactive than SH groups attached to primary aliphatic carbon atoms which are more reactive than SH groups attached to secondary aliphatic carbon atoms, i.e., ArSH>RCH$_2$SH>RR'CHSH.

In the process of the above embodiment the polyvalent mercaptan and a first polymerizable unsaturated monomer mixture are radically polymerized. The first monomer mixture could be a single monomer or a mixture of two or more monomers. This polymerization is initiated by a mercapto group on the polyvalent mercaptan core via a standard chain transfer reaction. Because the polyvalent mercaptan group comprises thiol groups of different reactivities, these first monomers will react with preferably the most reactive thiols. The next step comprises the addition of a second polymerizable unsaturated monomer mixture to the product from the first radical polymerization. The second monomer mixture, which may or may not be different from the first unsaturated monomer mixture, is then radically polymerized with the polyvalent mercaptan core. Again because of the different reactivities of the thiol groups on the core, the second monomers will react preferably with the thiol groups of second order of reactivity. This process can be repeated with third, fourth, etc., monomers until all of the thiol groups are reacted. Because of the differences in reactivity of the thiol there is a great deal of control of the blockiness of the final polymer. As used herein, blockiness indicates that the arms of the polymer differ in composition from one arm to the next. The first arms formed are those emanating from the most reactive thiols, the next arms from the next most reactive, etc. Hence greater selectivity, which translates into better control of the heterogeneity of the polymer, results as compared to the method of U.S. Pat. No. 5,679,762.

Another embodiment is directed towards the sequential addition of monomers to the homocore. A stoichiometric amount of the first monomer is added, allowed to react, then any excess removed before addition of the second monomer. This process is continued with the third, fourth, etc., monomers until the desired polymer is obtained.

In any of the above embodiments, the monomer mixtures can be added by any method familiar to the skilled artisan including dropwise or by slug dose.

Monomers which may be used to prepare the polymeric arms of the star polymers of the present invention include olefinically unsaturated monomers selected from the group consisting of acrylic and methacrylic acids, acrylamide and methacrylamide, acrylonitrile and methacrylonitrile, alkoxyalkyl acrylamides and methacrylamides, e.g., butoxymethyl acrylamide and methoxymethyl methacrylamide, hydroxyalkyl acrylamides and methacrylamides, e.g., N-methylol acrylamide and methacrylamide, the metal salts of acrylic and methacrylic acids, and the esters of acrylic and methacrylic acids with alcohols and phenols; the vinyl aromatic compounds, e.g., styrene, alpha-methylstyrene and substituted derivatives thereof such as the halogenated derivatives thereof and vinyl toluene; the vinyl esters; vinyl amides, e.g., vinyl acetate and vinyl pyrrolidone; ethylenically unsaturated nitriles and combinations thereof.

Monomers may be selected from hydroxyalkyl esters of ethylenically unsaturated carboxylic acids, ethylenically unsaturated carboxylic acids, ethylenically unsaturated epoxides, ethylenically unsaturated isocyanates and combinations thereof.

The acrylic monomers that may be used to form the polymeric arms of the star polymer include alpha, beta-unsaturated mono- and dicarboxylic acids having 3 to 5 carbon atoms, acrylate ester monomers selected from the group consisting of the alkyl esters of acrylic and methacrylic acid in which the alkyl groups contain 4 to 14 carbon atoms, preferably 4 to 8 carbon atoms, such as, n-butyl acrylate, n-pentyl acrylate, n-hexyl acrylate, n-heptyl acrylate, n-octyl acrylate, n-nonyl acrylate, and their corresponding branched isomers, such as, 2-ethylhexyl acrylate.

The vinyl monomers that may be used in combination with the acrylic monomers include vinyl monomers selected from the groups consisting of vinyl esters, vinyl ethers, vinyl halides, vinylidene halides, and nitriles of ethylenically unsaturated hydrocarbons, and include, vinyl acetate, acrylamide, t-octyl acrylamide, acrylic acid, vinyl ethyl ether, vinyl chloride, vinylidene chloride, acrylonitrile, maleic anhydride and styrene.

In addition, other acrylate monomers, such as methyl acrylate and methyl methacrylate, which are not considered tacky or pressure sensitive, may be used in combination with the acrylic monomers, or the combination of acrylic and vinyl monomers, known to have pressure sensitivity. If the resulting adhesive is to be used in pressure sensitive applications, combinations of acrylic and vinyl monomers known to have pressure sensitivity can be used. The total amount of the monomer will be such that the monomers known to impart pressure sensitivity will constitute at least about 50% by weight of the total copolymer.

Other unsaturated monomers include hydroxypropyl (meth)acrylate, glycidyl (meth)acrylate, methoxyethyl (meth)acrylate, ethoxyethyl (meth)acrylate, ethoxyethoxyethyl (meth)acrylate, cyanoethylacrylate and the like; vinyl ethers which are represented by methyl vinyl ether, ethyl vinyl ether, isobutyl vinyl ether, and the like; fumaric acid, monoalkyl fumarates, dialkyl fumarates; maleic acid, monoalkyl maleates, dialkyl maleates; itaconic acid, monoalkyl itaconates, dialkyl itaconates; half esters of succinic anhydride or phthalic anhydride with hydroxyethyl (meth)acrylate; (meth)acrylonitrile, butadiene, isoprene, vinyl chloride, vinylidene chloride, vinyl ketones, vinyl pyridine, vinyl carbazole, and the like. These compounds may be used either alone or in combinations with each other.

The present invention also contemplates the use of multifunctional monomers such as ethylene glycol di(meth)acrylate, trimethylolpropane tri(meth)acrylate, diethylene glycol di(meth)acrylate trisacrylate, divinyl benzene, triallyl cyanurate, allyl acrylate, diallyl phthalate, diallyl sucrose.

The preferred monomers are acrylic acid and methacrylic acid and derivatives such as esters and amides which have chain transfer constants with thiols that are close to one. Examples of such monomers are of the formula $CH_2=C(R)COOR'$ where R is H or methyl and R' is H or $C_{1-12}$ alkyl, $C_{5-10}$ cycloalkyl or $C_{6-10}$ aryl wherein the alkyl, cycloalkyl or aryl is optionally substituted with halo or hydroxy. Examples of such monomers include acrylic and methacrylic acid and esters of acrylic acid and methacrylic acid such as methyl acrylate, ethyl acrylate, n-butyl acrylate, 2-ethylhexyl acrylate, 2-hydroxyethyl acrylate, hydroxy propyl acrylate, isobornyl acrylate, methyl methacrylate, ethyl methacrylate, n-propyl methacrylate, isopropyl methacrylate, n-butyl methacrylate, isobutyl methacrylate, cyclohexyl methacrylate, isobornyl methacrylate, 2-ethylhexyl methacrylate, benzyl methacrylate, phenyl methacrylate, hydroxyethyl methacrylate and hydroxypropyl methacrylate. Also included are the $C_{1-18}$ alkyl esters of methacrylic acid.

Methyl methacrylate, 2-ethylhexyl acrylate, methyl acrylate, acrylic acid, butyl methacrylate, 2-hydroxyethyl acrylate and butyl acrylate are the most preferred monomers.

When the polymeric arm is prepared from acrylic and methacrylic monomer units, the polymer arm of the resulting polymer comprises 10 to 1500 monomer units, preferably 20 to 500. When a mixture of monomers is used, the copolymer may be a block or random copolymer of such units. Preferably the copolymer is a random copolymer as produced through conventional free radical polymerization.

The exact relative amounts of the specific components making up the acrylic-based adhesive are dependent upon the final properties desired and the end uses contemplated, and are known in the art. The acrylic or vinyl monomers that ultimately will react with a monomer containing a functional group capable of reacting under non-free radical conditions will contain hydroxyl, amine, carboxyl, isocyanato or amide groups. Examples of such monomers are 2-hydroxyethyl acrylate, 2-hydroxypropyl acrylate, 4-hydroxybutyl acrylate, and their corresponding methacrylates; acrylic acid and methacrylic acid; t-butyl-aminoethylmethacrylate, acrylamide and methacrylamide; 1-(1-isocyanato-1-methyl ethyl)-3-(1-methyl ethenyl)benzene ("m-TMI"), glycidyl (meth)acrylate, ("GMA"), and allyl alcohol. In general, the functional olefinic monomer will be present in an amount from 0.1% to 15% by weight of the polymer.

Free radical initiators suitable for use in the polymerization process of the present invention include, for example: azo-based polymerization initiators such as 2,2'-azobisisobutyronitrile and 2,2'-azobiscyclohexanecarbonitrile; peroxide-based polymerization initiators such as benzoyl peroxide; and the like. Other suitable initiators include organic peroxides, hydroperoxides, persulfates and azo compounds such as methyl ethyl ketone peroxide, cumene hydroperoxide, potassium persulfate, lauroyl peroxide, 2,5-dimethyl-2,5-di(t-butylperoxy)hexane, diethyl peroxide, dipropyl peroxide, dilauryl peroxide, dioleyl peroxide, distearyl peroxide, di(tertiary butyl)peroxide, di(tertiary amyl)peroxide, tertiary butyl hydroperoxide, tertiary amyl peroxide, acetyl peroxide, propionyl peroxide, lauroyl peroxide, stearoyl peroxide, malonyl peroxide, succinyl peroxide, phthaloyl peroxide, acetyl benzoyl peroxide, propionyl benzoyl peroxide, ascaridole, ammonium persulfate, sodium persulfate, sodium percarbonate, potassium percarbonate, sodium perborate, potassium perborate, sodium perphosphate, potassium perphosphate, tetralin hydroperoxide, tertiary butyl diperphthalate, tertiary butyl perbenzoate, 2,4-dichlorobenzoyl peroxide, urea peroxide, caprylyl peroxide, p-chlorobenzoyl peroxide, 2,2-bis (tertiary butyl peroxy)butane, hydroxyheptyl peroxide.

Whether or not the reaction will require a solvent will depend on the monomers and core selected. If the polymerization process is one which requires a solvent, as determined by one of skill in the art, a solvent can be selected from the group consisting of organic solvents which are represented by: aromatic hydrocarbons such as toluene and xylene; esters such as ethyl acetate and butyl acetate; cycloaliphatic hydrocarbons such as cyclohexane; aliphatic hydrocarbons such as hexane and pentane; ketones such as acetone, methyl ethyl ketone, and methyl isobutyl ketone; aliphatic esters; alcohols; and the like. Other suitable solvents include naphthalene, trichlorobenzene, dimethylformamide and dimethylacetamide.

The base star polymers are prepared in the manner described above, followed by a non-free radical reaction of this polymer with a functional olefin.

After the polymerization is complete, the pendant functionality on the polymer chain is reacted in a condensation reaction with a monomer containing a functional group capable of reacting under non-free radical conditions. Examples of functional olefins that can react with the polymeric arms of the star polymer via non-free radical conditions, i.e., condensation, include hydroxy ethyl (meth) acrylate, of 1-(1-isocyanato-1-methyl ethyl)-3-(1 -methyl ethenyl)benzene ("m-TMI"), glycidyl (meth)acrylate ("GMA"), maleic anhydride, acrylic acid and mixtures thereof.

The amount of monomer, containing a functional group capable of reacting under non-free radical conditions, for ultimate irradiation crosslinking that is incorporated into the polymeric chain will be a sufficient amount to provide crosslinking such that there is a balance of tack, peel adhesion, and cohesive strength for the end use contemplated. This amount will be dependent on the polymeric composition, as well as the source of radiation, the amount of radiation received, the production line speed, and the thickness of the adhesive coating on the substrate. In general, this amount will be in the range of 0.01 to 10 weight percent.

The polymer composition may also comprise various other additives chosen based upon the contemplated end use of the polymer. For example, if the end use if a pressure sensitive adhesive additives such as pasticizers, tackifiers, and fillers, which are conventionally used in the preparation of hot melts and pressure sensitive adhesives can be added. The choice and amount of these additives are within the expertise of those skilled in the art.

After the polymer composition is prepared, it is crosslinked by ultraviolet (UV) or electron beam (EB) radiation in air or nitrogen atmospheres, which transforms the low cohesive material into an elastomeric adhesive of higher plasticity. The crosslinking may be done immediately during or after application of the polymer to improve mechanical strength, heat resistance and chemical resistance for high performance applications.

The polymer composition disclosed herein can be used in most pressure sensitive applications where a hot melt composition or hi solids solution is applied to a backing or substrate. The substrate can be in the form of films, tapes, sheets, panels, and the like, and can be made of materials, such as, paper, fabric, plastic, nonwoven fibers, metal, foil, natural rubber, synthetic rubber, wood and plywood.

Application of the hot melt or high solids solution to the substrate may be accomplished using any conventional means, such as, roller, slot orifice, spray or extrusion coating. If a coated substrate is to be used in the form of a roll, the back of the substrate may be coated with a release backsize to prevent the adhesive from adhering to that side of the substrate. If a substrate is to be coated on both sides and rolled, a release paper or other protective means may be laid on one adhesive layer to prevent that adhesive layer from adhering to the adhesive on the other side of the substrate. In some uses, a second substrate may be applied directly to the adhesive.

A pressure sensitive adhesive film may be formed by applying the hot melt or high solids solution to a release material, such as silicone coated paper, and then after curing, the adhesive may be stripped from the release material and used as a film.

After the adhesive is applied, it is crosslinked by ultraviolet (UV) or electron beam (EB) radiation in air or nitrogen atmospheres, which transforms the low cohesive material into an elastomeric adhesive of higher plasticity. The crosslinking may be done immediately after application or at room temperature.

If electron beam radiation is used to crosslink the adhesive, a radiation level of 1 to 6 megarads is usually sufficient to accomplish the desired amount of crosslinking. The actual radiation level required will be dependent upon the source and intensity of the radiation, the adhesive system being crosslinked, the thickness of the adhesive film, and environmental and other factors. In most practical systems, 3 to 7 megarads is the preferred radiation dose. The preferred source of radiation is high energy beams from an electron accelerator. High energy beams give an adequate curing dosage and rates of processing as high as 1200 meters per minute. Various types of high power electron linear accelerators are available commercially. Typical operational energies are in the range of 30–300 keV. Suitable conventional units which operate in the upper part of this range are exemplified by the Electrocurtain® Processor from Energy Sciences, Inc., Wilmington, Mass. The Min EB® Processor from American International Technology operates in the range 30–75 keV. Due to its reduced X-radiation hazard, higher efficiency and compact size, the Min EB® Processor is preferred for thin coatings, less than about 0.002 inch in thickness. For thicker coatings, higher energy is required to ensure full depth of cure. Alternatively, other high energy radiation, such as gamma rays, may be used.

If ultraviolet radiation is used to crosslink the adhesive, a photoinitiator is admixed with the polymeric base before crosslinking, usually in an amount from 0.1% to 6% by weight of the polymer. Suitable photoinitiators are well known to those skilled in the art, and include, but are not limited to, benzoin ethers, benzophenone, ketals, hydroxy acetophenones, phosphine oxides, morpholine substituted acetophenones, and Michler's ketone. A preferred photoinitiator is 1-hydroxycyclohexyl phenyl ketone, commercially available from Ciba-Geigy Corporation under the tradename Irgacure® 184.

Copolymerizable photoinitiators containing an unsaturated functional group, for example, allyl, vinyl or (meth) acrylate, may be incorporated into one or more arms of the star polymer. Alternatively, photoinitators may be incorporated following polymerization by reaction with an appropriate functional group on the polymer.

Energy transfer to initiate the formation of free radicals may be facilitated by the incorporation of suitable donor compounds or sensitizers in combination with photoinitiators, and if used, these compounds are employed in the known effective amounts. Examples of such compounds include tertiary amines, aldehydes and anthraquinones.

The adhesive containing the photoinitiator (and if desired, the photoactivator) is exposed to ultraviolet radiation having a wavelength within the range of 1800–4000 A, preferably 2000 to 3500 A, for a period of time sufficient to accomplish the desired amount of crosslinking. The exact length of exposure will be dependent upon the nature and intensity of the radiation, the particular ultraviolet photoinitiator and amount used, the adhesive system, the thickness of the adhesive film, environmental factors, and the distance between the radiation source and the adhesive film. The determination of these parameters is within the expertise of one skilled in the art. The actual radiation used can be actinic light from any source, provided it furnishes an effective amount of ultraviolet radiation, since the compositions of the invention activatable by actinic light will generally exhibit their maximum sensitivity to wavelengths in the ultraviolet range. Suitable sources of radiation are carbon arcs, mercury-vapor arcs, fluorescent lamps with special ultraviolet light emitting phosphorus, electronic flash lamps, and the like, and combinations of those. Preferred lamps are the electrodeless microwave powered lamps from Fusion Systems, Rockland, Md., or arc lamps from EYE UV, Wilmington, Mass.

Irradiation may be carried out at any temperature, and most suitably is carried out at room temperature for economic reasons. The distance between the radiation source and adhesive on the coated substrate may range from about 0.32 cm to 25.4 cm (⅛th to 10 inches), and preferably is from 0.32 cm to 17.8 cm (⅛ to 7 inches).

The following examples are merely illustrative and not intended to limit the scope of the present invention in any manner.

EXAMPLES

The following test procedures were used in the examples:

Solution viscosities were determined on a Brookfield Model RVT viscometer operated at 25 rpm and 22° C.

The peel strength was measured from stainless steel panels in accordance with the Pressure Sensitive Tape Council ("PSTC"), Chicago, Ill. Test Method No. 1. Here, "initial" peel represents a bonded time lapse of 20 minutes rather than the specified 1 minute. "24 hrs OP" indicates a bonded time lapse of 24 hours and is indicative of the tendency for peel strength to increase with time after bonding. The test strip backing is 0.002 inch thick PET (polyethylene terephthalate) film and the dry adhesive coating weight is 25 $g/m^2$. The dry adhesive coatings are preconditioned overnight and then tested at 22° C. and 50% R.H. The average test results are recorded in units of ounces per inch width.

The shear test is conducted in accordance with PSTC Test Method No. 7. The coating preparation, preconditioning and test conditions are the same as for the peel test. Fifteen minutes elapsed time after bonding is allowed before attaching the load. A 1 kg weight is used on 1 square inch of bonded area giving 4.4 psi (nominally indicated as 4 psi in the Tables). The average time to failure is recorded in hours.

Dynamic Mechanical Analysis: The temperature spectrum of linear viscoelastic properties for the dry adhesive film is determined at 10 radians/second over the range from −70° to +190° C. using a Rheometrics Model RDA700 rheometer.

Example 1

Stage I: Preparation of base polymer: A mixture of acrylates in the ratio of 50 parts 2-ethylhexyl acrylate, 35 parts methyl acrylate and 10 parts butyl acrylate were polymerized with 5 parts hydroxypropyl methacrylate in the presence of different levels of (0.25, 0.5, 0.75 parts) pentaerythritol tetrakis(3-mercaptopropionate) as a chain transfer agent to give a polymer with 0.35 mmol hydroxy functionality per gram of polymer. The reagents and procedure were as described below for 0.25 parts pentaerythriol tetrakis(3-mercaptopropionate).

| Materials | Weight (g) |
| --- | --- |
| Monomer Mix: | |
| 2-Ethylhexyl acrylate | 250 |
| Methyl acrylate | 175 |
| Butyl acrylate | 50 |
| Hydroxypropyl methacrylate | 25 |
| Pentaerythritol tetrakis(3-mercaptopropionate) | 1.25 |
| Initial Charge: | |
| Monomer mix | 50 |
| Ethyl acetate | 80 |
| 2,2'-Azo-bis(2-methylbutanenitrile) | 0.5 |
| Monomer Slow Add: | |
| Monomer mix | 450 |
| Initiator Slow Add: | |
| Ethyl acetate | 60 |
| 2,2'-Azo-bis(2-methylbutanenitrile) | 5 |

The monomer mix was prepared and thoroughly mixed. The initial charge was charged to a 1000 mL reaction flask, equipped with a condenser, paddle stirrer, thermometer, addition funnels and water bath. The initial charge was heated to reflux and held for 10 minutes. Monomer mix and initiator solution were slow added simultaneously and continuously over 2 and 3 hours respectively while maintaining reflux. At the end of initiator slow add, reaction mixture was held at reflux for 3 hours. The contents were cooled to 25° C. and analyzed for residual 2-ethylhexyl acrylate ("2-EHA"), butyl acrylate ("BA"), methylacrylate ("MA"), hydroxypropyl methacrylate ("HPMA"), % solid, intrinsic viscosity and molecular weight. The base polymer prepared with 0.25 parts pentaerythriol tetrakis(3-mercaptopropionate) is designated Base Polymer 1A; with 0.5 parts, Base Polymer 1B; with 0.75 parts, Base Polymer 1C.

Stage-II: Urethane reaction and solvent strip: The reaction was carried out in the same flask with the same set-up with the addition of a CaCl$_2$ drying tube on top of the condenser. The olefinic monomer 1-(1-isocyanato-1-methyl ethyl)-3-(1-methyl ethenyl)benzene ("m-TMI") 0.14 mmol/g of polymer was added to the base polymer solutions (1A, 1B, 1C) and stirred for 10 minutes at 30° C. Dibutyltin dilaurate catalyst 4.38×10$^{-4}$ g/g of polymer was added to the reaction mixture. The reaction mixture was stirred for an additional 10 minutes and heated to reflux for 12 hours. When the reaction was complete, the solvent was stripped under reduced pressure (10 to 30 mm Hg) at 95° C. and the reaction product was discharged while still at approximately 80° to 90° C.

UV cure polymer: Samples for UV curing polymers were prepared by adding 2% IRGACURE 184 (1-hydroxycyclohexyl phenyl ketone) photoinitiator after the completion of the reaction and before vacuum stripping the solvent.

Analytical properties for base polymers are listed in the following table:

TABLE 1

| BASE POLYMER: | 1A | 1B |
|---|---|---|
| Pentaerythritol tetrakis (3-mercaptopropionate) (parts) | 0.25 | 0.5 |
| % Solid | 75.99 | 75.75 |
| Mw | 137,000 | 101,000 |
| Mn | 24,600 | 18,200 |
| Sample | 1A-1 | 1B-1 |
| Base polymer | 1A | 1B |
| Curing radiation | EB | EB |

| SAMPLE | 1A-1 | 1B-1 | Control |
|---|---|---|---|
| Polymer | 4-arm star | 4-arm star | linear |
| viscosity @ 300° F. | 30,000 cps | 15,000 cps | 10,000 cps |
| Coating thickness | 1 mil | 1 mil | 1 mil |
| substrate | 2 mil PET | 2 mil PET | 2 mil PET |
| dosage | 6 Mrads | 6 Mrads | 6 Mrads |
| Accelerating Voltage | 165 kV | 165 kV | 165 kV |
| Peel, initial, 20 min @ RT (oz/in) | 28 | 30 | 29.5 |
| Peel, 24 hrs OP @ RT (oz/in) | 30 | 43 | 35.5 |

TABLE 1-continued

| Shear 4PSI @ RT (hr) | 91 | 37.5 | 27 |
|---|---|---|---|

Example 2

A mixture of acrylates in the ratio of 50 parts 2-ethylhexyl acrylate, 35 parts methyl acrylate and 10 parts butyl acrylate were polymerized with 5 parts hydroxypropyl methacrylate in the presence of different levels of (0.25 and 0.5 parts) tetrafunctional polymercaptan, pentaerythritol bis(2-mercaptopropionate)bis(3-mercaptopropionate) to give a polymer with 0.35 mmol hydroxy functionality per gram of polymer, base polymers 6A and 6B. For comparison purpose, polymers were prepared by equimolar replacement of tetrafunctional polymercaptan with linear methyl 3-mercaptopropionate, and polymers without any chain transfer agent were prepared, samples 6C, 6D, 6E. The procedure used for base polymer preparation and urethane reaction was same as listed for Example I. Samples 6A, 6C, 6B, 6D, 6E were functionalized with m-TMI and designated 6A-1, 6C-1, 6B-1, 6D-1, 6E-1, respectively. Solvent was not removed, and the samples analyzed in a solution form. The results are shown below in Table 2. Samples 6A-1 and 6C-1 where cured at different energy levels, and the results shown in Table 3.

The results in Tables 2 and 3, indicate that star polymers, when compared to linear polymer prepared with equivalent amounts of chain transfer agent, had lower solution viscosity. See for examples the results for samples 6A vs 6C and 6B-1 vs 6D-1.

Both 6A and 6B, which are 4-arm star polymer, and the linear control polymer are not functionalized with pendant C═C. Samples 6A-1 and 6B-1 are functionalized versions of 6A and 6B respectively. The results in the table indicate that polymer with C═C functionality efficiently crosslinks with radiation giving high cohesion. Furthermore, star polymer 6A-1, which has a lower apparent molecular weight, has better adhesive properties than the linear version of the same polymer. Similarly, star polymer 6A-1 has better pressure sensitive properties, peel adhesion and tack, than linear polymer 6C-1 which has the highest molecular weight among the series tested. These results demonstrate the advantage of a star polymer with pendant C═C functionality in radiation curable pressure sensitive adhesives.

TABLE 2

| Sample | 6A Comparative | 6C Comparative | 6A-1 | 6C-1 | 6B-1 | 6D-1 | 6E-1 |
|---|---|---|---|---|---|---|---|
| Mercaptan | Heterocore | Linear | Heterocore | Linear | Heterocore | Linear | none |
| B.F. Visc. @ 24° C. | 45,000 cps | 130,000 cps | 45,400 cps | 141,000 cps | 14,000 cps | 64,000 cps | 119,000 cps |
| Solids (%) | 74.64 | 75.37 | 72.65 | 73.28 | 73.32 | 73.07 | 73.29 |
| Coating thickness | 1.5 mil | 1.5 mil | 1.5 mil | 1.5 mil | 1.5 mil | 1.5 mil | 1.5 mil |
| Substrate | 2 mil PET | 2 mil PET | 2 mil PET | 2 mil PET | 2 mil PET | 2 mil PET | 2 mil PET |
| Dosage | 6 Mrads | 6 Mrads | 6 Mrads | 6 Mrads | 6 Mrads | 6 Mrads | 6 Mrads |
| Kv | 165 Kv | 165 Kv | 165 Kv | 165 Kv | 165 Kv | 165 Kv | 165 Kv |
| Peel, initial, @ RT (oz/in) | 89.5 | 135.5 | 31.5 | 34.5 | 30.5 | 20.5 | 22 |
| Peel, 24 hrs OP @ RT (oz/in) | 95.5 | 130.5 | 35.5 | 33 | 46 | 25 | 30.5 |
| Shear, 4PSI @ RT (hr) | 3 min | 23 min | 29.3 | 15.4 | 14.3 | 25.4 | 27.7 |
| Mw | 136,000 | 197,000 | 136,000 | 197,000 | 85,200 | 168,000 | 224,000 |
| Mn | 21,500 | 22,500 | 21,500 | 22,500 | 17,900 | 23,900 | 26,200 |

TABLE 3

| Sample | 6A-1 | 6C-1 | 6A-1 | 6C-1 | 6A-1 | 6C-1 |
|---|---|---|---|---|---|---|
| Mercaptan | Heterocore | Linear | Heterocore | Linear | Heterocore | Linear |
| B.F. Visc. @ 24° C. | 45,400 | 141,000 | 45,400 | 141,000 | 45,400 | 141,000 |
| Solids (%) | 72.65 | 73.28 | 72.65 | 73.28 | 72.65 | 73.28 |
| Coating thickness | 1.5 mil | 1.5 mil | 1.5 mil | 1.5 mil | 1.5 mil | 1.5 mil |
| Substrate | 2 mil PET | 2 mil PET | 2 mil PET | 2 mil PET | 2 mil PET | 2 mil PET |
| Energy Level | 0.95 J/cm2 | 0.95 J/cm2 | 1.41 J/cm2 | 1.41 J/cm2 | 2.19 J/cm2 | 2.19 J/cm2 |
| UV Source | 1 D bulb | 1 D bulb | 1 D bulb | 1 D bulb | 1 D bulb | 1 D bulb |
| Peel, initial, @ RT (oz/in) | 96 | 51 | 92 | 42 | 87 | 37 |
| Peel, 24 hrs OP @ RT (oz/in) | 82.5 | 63 | 104 | 51.5 | 102 | 41 |
| Shear, 4PSI @ RT (hr) | 7 min | 95 min | 7 min | 100 min | 13 min | >250 hrs |
| Mw | 136,000 | 197,000 | 136,000 | 197,000 | 136,000 | 197,000 |
| Mn | 21,500 | 22,500 | 21,500 | 22,500 | 21,500 | 22,500 |

Example 3

A mixture of acrylates in the ratio of 50 parts 2-ethylhexyl acrylate, 35 parts methyl acrylate and 10 parts butyl acrylate were polymerized with 5 parts hydroxypropyl methacrylate in the presence of different levels of (0.25 and 0.5 parts) tetrafunctional polymercaptan with dual reactivity, pentaerythritol bis(2-mercaptopropionate)bis(3-mercaptopropionate), to give a polymer with 0.35 mmol hydroxy functionality per gram of polymer. Samples 7A and 7B, respectively. The procedure used to make the polymer, by sequential addition of monomers, is described below.

Ethyl acetate, 2-EHA, HPMA and VAZO 67, an azo initiator available from DuPont were charged as an initial charge to the flask and heated to reflux. After 10 minutes of the reflux, started monomer slow add-1 containing 2-EHA, HPMA and polymercaptan over 1 hour. Simultaneously initiator slow add-3 containing ethyl actate ("EtOAc") and VAZO 67, an azo initiator from DuPont, started over 4 h. At the end of monomer slow add-1, wait for 1 hour. Started monomer slow add-2 over 2 hour. At the end of slow adds, hold for 2 hour. The contents were cooled to 25° C. and analyzed for residual 2-EHA, BA, MA, HPMA, percent solid, intrinsic viscosity and molecular weight.

Procedure used for urethane reaction was same as mentioned in Example VI. Final polymers were E-Beam cured and analyzed in solution form and the results shown below in Table IV.

TABLE 4

| EBEAM CURABLE STAR BRANCHED POLYMERS | | |
|---|---|---|
| Sample ID | 7A | 7B |
| Mercaptan | Heterocore | Heterocore |
| B.F. Visc. @ 24C | 124,000 cps | 70,000 cps |
| Solids (%) | 77.4 | 77.3 |
| Coating thickness | 1.5 mil. | 1.5 mil. |
| Substrate | 2 mil PET | 2 mil PET |
| Dosage | 6 Mrads | 6 Mrads |
| Kv | 165 Kv | 165 Kv |
| Peel, initial 20 min. @ RT (oz/in) | 5.5 | 19.5 |
| Peel, 24hrs OP @ RT (oz/in) | 10 | 30.5 |
| Shear, 4PSI @ RT (hr) | 10.4 hrs | 2.3 hrs |
| Iv | 0.339 | 0.268 |

TABLE 4-continued

| EBEAM CURABLE STAR BRANCHED POLYMERS | | |
|---|---|---|
| Sample ID | 7A | 7B |
| Mw | 95,600 | 73,900 |
| Mn | 20,900 | 17,900 |
| D | 4.57 | 4.13 |

We claim:

1. A process for preparing a radiation curable adhesive composition comprising:
   (a) preparing a star polymer comprising
      i) polymerizing a mercaptan core and one or more compatible monomers wherein the core is of the general formula:

$X\text{-}(Y_1\text{-}SH)_a(Y_2\text{-}SH)_b(Y_3\text{-}SH)_c(Y_4\text{-}SH)_d(Y_5\text{-}SH)_e(Y_6\text{-}SH)_f(Y_7\text{-}SH)_g(Y_8\text{-}SH)_h$ wherein X is derived from an organic radical having a valence of 3–8; $Y_1$, $Y_2$, $Y_3$, $Y_4$, $Y_5$, $Y_6$, $Y_7$ and $Y_8$ are the same or different and each comprise $C_{2-10}$ alkanoic acids and vinyl monomers, at least one of which also contains a functional group, such as, a hydroxyl, amine, carboxyl or amide group; a, b, c, d, e, f, g, h are integers from 0–8, provided that $a+b+c+d+e+f+g+h \leq 8$;
   (b) reacting the functional group on the star polymer with a monomer containing both a pendant vinyl group, and a functional group capable of reacting under non-free radical conditions.

2. A process according to claim 1 additionally comprising (c) exposing the polymer to electron beam or ultraviolet radiation sufficient to crosslink the pendant vinyl groups and provide a pressure sensitive adhesive.

3. The process of claim 1 or 2 wherein a and b are integers from 1–8, and c, d, e, f, g, h are integers from 0–8, provided that $a+b+c+d+e+f+g+h \leq 8$.

4. The process of claim 1 or 2 wherein b=c=d=e=f=g=h=0.

5. The process of claim 1 wherein the compatible monomers are selected from the group consisting of the esters and amides of acrylic and methacrylic acids with alcohols, phenols and amines; the vinyl aromatic compounds, and substituted derivatives thereof; vinyl esters; vinyl amides, ethylenically unsaturated nitriles, hydroxyalkyl esters of ethylenically unsaturated carboxylic acids, ethylenically unsaturated carboxylic acids, ethylenically unsaturated epoxides, ethylenically unsaturated isocyanates, ethylene glycol di(meth)acrylate, trimethylolpropane tri(meth)acrylate, diethylene glycol di(meth)acrylate trisacrylate, divinyl benzene, triallyl cyanurate, allyl acrylate, diallyl phthalate, diallyl sucrose and combinations thereof.

6. The process of claim 1 wherein the monomers containing functional groups are selected from the group consisting of 2-hydroxyethyl acrylate, 2-hydroxypropyl acrylate, 4-hydroxybutyl acrylate, and their corresponding methacrylates; acrylic acid and methacrylic acid; t-butyl-aminoethylmethacrylate, acrylamide and methacrylamide; 1-(1-isocyanato-1-methyl ethyl)-3-(1-methyl ethenyl) benzene, glycidyl (meth)acrylate, allyl alcohol and combinations thereof.

7. A process for preparing a radiation curable adhesive composition comprising
(a) preparing star polymer comprising:
i) admixing a core of differential reactivity of the general formula:

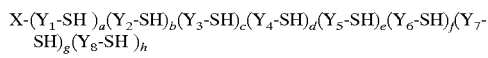

wherein X is derived from an organic radical having a valence of 3–8; $Y_1$, $Y_2$, $Y_3$, $Y_4$, $Y_5$, $Y_6$, $Y_7$ and $Y_8$ are the same or different and each comprise $C_{2-10}$ alkanoic acids or vinyl monomers, at least one of which also contains a functional group, such as, a hydroxyl, amine, carboxyl or amide group; a and b are integers from 1–8, and c, d, e, f, g, h are integers from 0–8 provided that $a+b+c+d+e+f+g+h \leq 8$.

ii) polymerizing the core and the first monomer mixture;
iii) adding to product of the polymerization step of part ii) a second monomer mixture;
iv) polymerizing the second monomer mixture and the product of the polymerization step of part ii);
(b) reacting the functional group on the star polymer with a monomer containing a functional group capable of reacting under non-free radical conditions.

8. A process according to claim 7 additionally comprising the step of (c) exposing the polymer to electron beam or ultraviolet radiation sufficient to crosslink the pendant vinyl groups and provide a pressure sensitive adhesive.

9. The process of claim 7 or 8 wherein a and b are integers from 1 to 8, and c, d, e, f, g, h are integers from 0 to 8, provided that $a+b+c+d+e+f+g+h \leq 8$.

10. The process of claim 7 or 8 wherein b=c=d=e=f=g=h=0.

11. The process of claim 7 or 8 wherein the first and second monomer mixtures are the same or different and are selected from the group consisting of the esters and amides of acrylic and methacrylic acids with alcohols, phenols and amines; the vinyl aromatic compounds, and substituted derivatives thereof; vinyl esters; vinyl amides, ethylenically unsaturated nitriles, hydroxyalkyl esters of ethylenically unsaturated carboxylic acids, ethylenically unsaturated carboxylic acids, ethylenically unsaturated epoxides, ethylenically unsaturated isocyanates, ethylene glycol di(meth)acrylate, trimethylolpropane tri(meth)acrylate, diethylene glycol di(meth)acrylate trisacrylate, divinyl benzene, triallyl cyanurate, allyl acrylate, diallyl phthalate, diallyl sucrose and combinations thereof.

12. The process of claim 7 wherein the monomers containing functional groups are selected from the group consisting of 2-hydroxyethyl acrylate, 2-hydroxypropyl acrylate, 4-hydroxybutyl acrylate, and their corresponding methacrylates; acrylic acid and methacrylic acid; t-butyl-aminoethylmethacrylate, acrylamide and methacrylamide; 1-(1-isocyanato-1-methyl ethyl)-3-(1-methyl ethenyl) benzene, glycidyl (meth)acrylate, allyl alcohol and combinations thereof.

13. A pressure sensitive adhesive prepared according to the process of claim 1 or 2.

14. A pressure sensitive adhesive prepared according to the process of claim 7 or 8.

15. A process according to claims 1, 2, 7 or 8 comprising at least one acrylic or vinyl monomer containing photoinitiator functionality.

16. An adhesive prepared according to claims 1 or 7 additionally comprising a photoinitiator.

17. An adhesive according to claim 16 wherein the photoinitiator is reacted with the polymer backbone.

18. A pressure sensitive adhesive coated article prepared by the process of claim 1, 2, 7 or 8.

* * * * *